(12) United States Patent
Thomas et al.

(10) Patent No.: US 11,284,146 B2
(45) Date of Patent: *Mar. 22, 2022

(54) SYSTEMS AND METHODS FOR CREATING A VIRTUAL CHANNEL FOR BINGE WATCHING

(71) Applicant: Rovi Guides, Inc., San Jose, CA (US)

(72) Inventors: William L. Thomas, Evergreen, CO (US); Margret B. Schmidt, Redwood City, CA (US); Alexander W. Liston, Menlo Park, CA (US); Jonathan A. Logan, Mountain View, CA (US); Gabriel C. Dalbec, Morgan Hill, CA (US); Mathew C. Burns, Dublin, CA (US); Ajay Kumar Gupta, Andover, MA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/929,294

(22) Filed: Jul. 15, 2020

(65) Prior Publication Data

US 2020/0404354 A1 Dec. 24, 2020

Related U.S. Application Data

(63) Continuation of application No. 16/023,140, filed on Jun. 29, 2018, now Pat. No. 10,757,461, which is a
(Continued)

(51) Int. Cl.
H04N 21/2668 (2011.01)
H04N 21/466 (2011.01)
(Continued)

(52) U.S. Cl.
CPC ... *H04N 21/2668* (2013.01); *H04N 21/44222* (2013.01); *H04N 21/458* (2013.01);
(Continued)

(58) Field of Classification Search
CPC ......... H04N 21/2668; H04N 21/44222; H04N 21/458; H04N 21/4667; H04N 21/4668; H04N 21/4622; H04N 21/4821
See application file for complete search history.

(56) References Cited

U.S. PATENT DOCUMENTS

| | | |
|---|---|---|
| 5,734,720 A | 3/1998 | Salganicoff |
| 7,403,935 B2 | 7/2008 | Horvitz et al. |

(Continued)

FOREIGN PATENT DOCUMENTS

| | | |
|---|---|---|
| EP | 3041251 | 7/2016 |
| WO | WO-2016069306 | 5/2016 |

OTHER PUBLICATIONS

International Search Report and Written Opinion for PCT/US2017/064758 dated Jan. 30, 2018.

*Primary Examiner* — Randy A Flynn
(74) *Attorney, Agent, or Firm* — Haley Guiliano LLP

(57) ABSTRACT

Systems and methods are described herein such that, a media guidance application presents, in an interactive program guide, a virtual content source for binge watching a program series. The media guidance application may determine a program series a user is currently watching. The media guidance application may receive a user selection of a media asset. The media guidance application may determine a length of time between a current time and a start time of the media asset. The media guidance application may determine the next episodes of the program series the user can watch before the start time of the media asset and present them using a virtual content source.

20 Claims, 9 Drawing Sheets

Related U.S. Application Data continuation of application No. 15/475,633, filed on Mar. 31, 2017, now Pat. No. 10,038,929.

(51) Int. Cl.
*H04N 21/442* (2011.01)
*H04N 21/458* (2011.01)
*H04N 21/482* (2011.01)
*H04N 21/462* (2011.01)

(52) U.S. Cl.
CPC ..... *H04N 21/4667* (2013.01); *H04N 21/4668* (2013.01); *H04N 21/4622* (2013.01); *H04N 21/4821* (2013.01)

(56) References Cited

U.S. PATENT DOCUMENTS

| | | |
|---|---|---|
| 7,788,688 B2 | 8/2010 | Kim |
| 8,209,424 B2 | 6/2012 | Klappert |
| 8,280,223 B2 | 10/2012 | Prestenback et al. |
| 8,402,493 B2 | 3/2013 | Roewe |
| 8,505,051 B2 | 8/2013 | Jang et al. |
| 8,561,108 B2 | 10/2013 | Bhogal et al. |
| 8,689,266 B2 | 4/2014 | Bhogal et al. |
| 8,701,139 B2 | 4/2014 | Scott et al. |
| 8,782,701 B2 | 7/2014 | Yu et al. |
| 8,793,729 B2 | 7/2014 | Adimatyam et al. |
| 8,819,735 B2 | 8/2014 | Rai et al. |
| 8,856,847 B2 | 10/2014 | Soroushian |
| 8,965,830 B2 | 2/2015 | Jung et al. |
| 9,015,736 B2 | 4/2015 | Cordray et al. |
| 9,197,872 B2 | 11/2015 | Bradley et al. |
| 9,357,266 B2 | 5/2016 | Garcia Navarro |
| 9,363,544 B2 | 6/2016 | Tomita |
| 9,380,343 B2 | 6/2016 | Webster et al. |
| 9,426,509 B2 | 8/2016 | Ellis et al. |
| 9,560,391 B2 | 1/2017 | Tirpak |
| 9,560,399 B2 | 1/2017 | Kaya et al. |
| 9,591,339 B1 | 3/2017 | Christie et al. |
| 9,699,491 B1 | 7/2017 | Docherty et al. |
| 9,723,256 B2 | 8/2017 | Tang et al. |
| 9,774,917 B1 | 9/2017 | Christie et al. |
| 9,854,321 B2 | 12/2017 | Ellis et al. |
| 9,866,888 B1 | 1/2018 | Thomas et al. |
| 9,906,837 B1 | 2/2018 | Docherty et al. |
| 10,038,929 B1 | 7/2018 | Thomas et al. |
| 10,116,993 B2 | 10/2018 | Knudson et al. |
| 10,123,095 B2 | 11/2018 | Mishra et al. |
| 10,176,178 B2 | 1/2019 | Nishimura |
| 10,200,761 B1 | 2/2019 | Christie et al. |
| 10,212,464 B2 | 2/2019 | Kaya et al. |
| 2003/0167471 A1 | 9/2003 | Roth et al. |
| 2005/0204388 A1 | 9/2005 | Knudson et al. |
| 2007/0154163 A1 | 7/2007 | Cordray |
| 2007/0157237 A1 | 7/2007 | Cordray et al. |
| 2007/0271222 A1 | 11/2007 | Fu |
| 2008/0065693 A1 | 3/2008 | Malik |
| 2008/0134043 A1 | 6/2008 | Georgis et al. |
| 2010/0017713 A1 | 1/2010 | Igarashi |
| 2010/0306654 A1 | 12/2010 | Lemieux et al. |
| 2011/0209167 A1 | 8/2011 | Yamamoto et al. |
| 2012/0054679 A1 | 3/2012 | Ma et al. |
| 2014/0229990 A1 | 8/2014 | Lee et al. |
| 2015/0365729 A1 | 12/2015 | Kaya et al. |
| 2016/0014461 A1 | 1/2016 | Leech et al. |
| 2016/0142783 A1 | 5/2016 | Bagga et al. |
| 2017/0302979 A1 | 10/2017 | Kaya et al. |
| 2017/0318338 A1 | 11/2017 | Rogers et al. |
| 2018/0007155 A1 | 1/2018 | Saito |
| 2018/0020251 A1 | 1/2018 | Hull et al. |
| 2018/0063580 A1 | 3/2018 | Wittke |
| 2018/0192130 A1 | 7/2018 | Liston et al. |
| 2018/0192137 A1 | 7/2018 | Patel et al. |

600

Thursday
March 2, 2017                    7:00 pm

Game of Thrones                  (2011)
Season 1                         55 Minutes
Episode 4
"Cripples, Bastards, and Broken Things"

| | 7:00 pm | 7:30 pm | 8:00 pm | 8:30 pm | 9:00 pm | 9:30 pm | 10:00 pm |
|---|---|---|---|---|---|---|---|
| 2 FOX | ET | TMZ | Master Chef | | My Kitchen Rules | | News |
| 3 ABC | Grey's Anatomy | | Scandal | | The Catch | | News |
| 4 NBC | News | Access | The Voice | | ChicagoMed | | News |
| 5 HBO (VOD) | HBO On Demand | | GAME OF THRONES | | | | |
| Game of Thrones | _Episode 4_ | | Episode 5 | | Episode 6 | | News |
| Recorded | Display Recorded Program Listings | | | | | | |
| CNN.com | Access CNN.com Video Content | | | | | | |

SYSTEMS AND METHODS FOR CREATING A VIRTUAL CHANNEL FOR BINGE WATCHING

CROSS REFERENCE TO RELATED APPLICATION

This application is a continuation of U.S. patent application Ser. No. 16/023,140, filed Jun. 29, 2018, which is a continuation of U.S. patent application Ser. No. 15/475,633, filed Mar. 31, 2017, now U.S. Pat. No. 10,038,929, which are hereby incorporated by reference herein in their entireties.

BACKGROUND

Due to the increase in on-demand viewing and online streaming, multiple episodes of serial programming media are now accessible to users for watching consecutively. For example, a user may wish to watch multiple episodes of a series in one sitting. However, current systems do not determine how many episodes a user normally watches in one sitting or how many episodes the user can watch before watching a media asset at a scheduled time.

SUMMARY

Accordingly, systems and methods are described herein ensuring that a user will be able to visualize and consume multiple episodes of a series using a virtual channel. In particular, a media guidance application described herein presents, in an interactive program guide, a virtual content source for binge watching a program series. For example, if a user binge watched the first three episodes of Game of Thrones in one session, then a virtual content source will be presented in the interactive program guide including the next three episodes of Game of Thrones.

The media guidance application may determine if a user is binge watching a program series. This determination may be made if the user watches more than one episode of the program series at a time. If the user has been binge watching a program series, the media guidance application may predict how many episodes the user may want to watch next based on the average number of episodes of the program series the user watches. For example, if the user typically watches two episodes at a time, the media guidance application may predict that the user will want to watch the next two episodes of the program series. The media guidance application may then present the predicted next episodes in a virtual content source representing the program series. The virtual content source may be presented in an interactive program guide alongside other content sources. The media guidance application may auto play the next episodes without any user intervention.

The media guidance application may determine how many episodes the user may want to watch based on the time of day or day of the week. For example, if it is a week day and the user has to go to work the next morning, the media guidance application may predict that the user will want to watch only the episodes that the user can watch before they want to go to sleep. The media guidance application may determine how many episodes the user may want to watch based on the amount of time available in the user's schedule.

The media guidance application may determine how many episodes the user may want to watch based on an established pattern of watching a broadcast program at a specific time. For example, if the user watches the late night local news program every night, the media guidance application may predict that the user will want to watch only the episodes that the user can watch before the start time of the late night local news program.

The media guidance application may present a virtual channel including episodes of multiple program series. The media guidance application may determine which episodes of the multiple program series to include based on the amount of time available in the user's schedule. For example, if the user has ninety minutes available in their schedule, the media guidance application may select a sixty minute episode of a program series and a thirty minute episode of a different program series.

Virtual channels offer the user a convenient way of visualizing media assets from various sources of content. The media guidance application may generate a virtual channel based on a particular content source, a particular program series, or user preferences. The media guidance application may generate a virtual channel composed of content that may not be broadcast content. For example, a channel that is created for media content that has been recorded may be considered a virtual channel.

Virtual channels may also be generated based on a user's past behavior patterns or moods. For example, if the user has a pattern of binge watching a particular program series when the user is angry, the virtual channel may be generated based on episodes of that particular program series. The media guidance application may present multiple virtual channels that correspond to different behavior patterns or moods.

Virtual channels may also be generated based on recommended program series. Virtual channels may also be generated based on a particular genre. For example, a virtual channel may be generated for sci-fi movies. Virtual channels may also be generated based on program type. For example, a virtual channel may be generated for reality shows. Virtual channels may also be generated based on a particular target audience. For example, a virtual channel may be generated for children. Virtual channels may also be generated based on the viewing history. For example, a virtual channel may be generated including the user's favorite shows presented in the user's typical viewing order.

The media guidance application may determine how many episodes of a program series the user can watch before the start time of a media asset the user wants to consume. For example, if the user wants to watch the news at a certain time, the media guidance application may determine how many episodes of a program series the user is currently watching can be consumed before the news begins.

In some aspects, a media guidance application may determine a program series a user has started watching. The determination of the program series may be performed by retrieving, from a database, a data structure, wherein the data structure comprises multiple indicators. In some embodiments, the media guidance application may extract, from the data structure, a first indicator of the multiple indicators corresponding to a program series, wherein the first indicator indicates a number of episodes of the program series the user has watched. In some embodiments, the media guidance application may determine that the number of episodes of the program series that user has watched is more than one.

The media guidance application may predict a number of episodes of the program series that the user will binge watch based on tracking an average number of episodes the user binge watches. The prediction of the number of episodes of the program series that the user will binge watch may be performed by extracting, from the data structure, a second indicator of the multiple indicators corresponding to the program series. The second indicator may indicate a first number of binge watching sessions during which the user has watched at least one episode of the program series. In some embodiments, the media guidance application may calculate an average number of episodes the user watches in one binge watching session based on the number of episodes of the program series the user has watched and the first number of binge watching sessions during which the user has watched at least one episode of the program series. In some embodiments, the media guidance application may determine a predicted second number of episodes of the program series that the user will watch during a current binge watching session based on the average number of episodes the user watches in one binge watching session. In some embodiments, the media guidance application may determine the predicted second number of episodes of the program series that the user will watch during the current binge watching session based on the time of day or day of the week associated with a prior binge watching session.

The media guidance application may determine multiple episodes of the program series that the user has not watched. In some embodiments, the media guidance application may determine, based on the first indicator of the multiple indicators corresponding to the program series, multiple next episodes of the program series the user has not watched.

The media guidance application may select a subset of the multiple episodes of the program series that the user has not watched based on the predicted number of episodes of the program series.

The media guidance application may create the virtual content source including the subset of the multiple episodes of the program series that the user has not watched. In some embodiments, the media guidance application may create the virtual content source by retrieving the subset of the multiple next episodes of the program series from multiple content sources. In some embodiments, the multiple content sources may comprise broadcast, on-demand, recorded, and streaming video content sources.

The media guidance application may generate for display, in the interactive program guide, the virtual content source simultaneously with multiple media asset indicators corresponding to at least one other content source.

In some embodiments, the media guidance application may extract, from the data structure, a third indicator of the multiple indicators corresponding to the program series. The third indicator may indicate a third number of binge watching sessions during which the user has watched at least two episodes of the program series. In some embodiments, the media guidance application may determine that the third number of binge watching sessions during which the user has watched at least two episodes of the program series is more than one. In some embodiments, the media guidance application may determine, based on the first indicator of the multiple indicators corresponding to the program series, the multiple next episodes of the program series the user has not watched. In some embodiments, the media guidance application may determine the predicted second number of episodes of the program series that the user will watch during the current binge watching session based on a second average number of episodes the user watched during the third binge watching sessions.

In some embodiments, the media guidance application may extract, from the data structure, a fourth indicator of the multiple indicators corresponding to the program series. The fourth indicator may indicate an average length of time the user spends watching the program series during the first binge watching sessions. In some embodiments, the media guidance application may determine the predicted second number of episodes of the program series that the user will watch during the current binge watching session based on the average length of time.

In some embodiments, the average number of episodes the user watches in one binge watching session may be more than the multiple next episodes of the program series the user has not watched. In some embodiments, the media guidance application may extract, from the data structure, a fifth indicator of the multiple indicators corresponding to the program series. The fifth indicator may indicate a related program series the user has not watched. In some embodiments, the media guidance application may determine a third number of episodes of the related program series that the user will watch based on the difference between the average number of episodes the user watches in one session and the multiple next episodes of the program series the user has not watched. In some embodiments, the media guidance application may select a second subset of multiple episodes of the related program series based on the third number of episodes of the related program series that the user will watch. In some embodiments, the media guidance application may create the virtual content source including the first subset of the multiple next episodes of the program series and the second subset of the multiple episodes of the related program series. The first subset of the multiple next episodes of the program series and the second subset of the multiple episodes of the related program series may be presented in sequence. The first subset of the multiple next episodes of the program series may be presented first.

The media guidance application may receive a user selection of a media asset.

In some embodiments, the media guidance application may determine a start time of the media asset. In some embodiments, the media guidance application may extract, from a data structure, a second indicator of the multiple indicators corresponding to the media asset. In some embodiments, the second indicator may indicate a start time of the media asset.

In some embodiments, the media guidance application may determine a length of time between a current time and the start time of the media asset.

In some embodiments, the media guidance application may determine a number of episodes of the program series the user can watch in the length of time before the start time of the media asset. In some embodiments, the media guidance application may extract, from a data structure, a third indicator of the multiple indicators corresponding to the program series. In some embodiments, the third indicator may indicate an average length of each of the multiple next episodes of the program series the user has not watched. In some embodiments, the media guidance application may determine a number of episodes of the program series the user can watch in the length of time before the start time of the media asset based on the average length of each of the multiple next episodes of the program series the user has not watched.

In some embodiments, the media guidance application may select a subset of the multiple episodes of the program series that the user has not watched based on the number of episodes the user can watch.

In some embodiments, the number of episodes the user can watch in the length of time is greater than the multiple next episodes of the program series that the user has not watched. In some embodiments, the media guidance application may extract, from the data structure, a fourth indicator of the multiple indicators corresponding to the program series. In some embodiments, the fourth indicator may indicate a related program series the user has not watched. In some embodiments, the media guidance application may select a second subset of multiple episodes of the related program series based on the number of episodes of the program series the user can watch in the length of time and the multiple next episodes of the program series the user has not watched. In some embodiments, the media guidance application may create the virtual content source including the subset of the multiple next episodes of the program series and the second subset of the multiple episodes of the related program series. In some embodiments, the subset of the multiple next episodes of the program series and the second subset of the multiple episodes of the related program series are presented in sequence. In some embodiments, the subset of the multiple next episodes of the program series is presented first.

In some embodiments, the media guidance application may create the virtual content source including the media asset the user will watch at the start time. In some embodiments, the subset of the multiple next episodes of the program series and the media asset the user will watch at the start time are presented in sequence. In some embodiments, the subset of the multiple next episodes of the program series is presented first.

In some embodiments, the media asset corresponds to an episode of a related program series related to the program series. In some embodiments, the media guidance application may create the virtual content source including a recent episode of the related program series. In some embodiments, the subset of the multiple next episodes of the program series and the recent episodes of the related program series are presented in sequence. In some embodiments, the subset of the multiple next episodes of the program series is presented first.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 shows another illustrative example of a display screen used in accessing media content in accordance with some embodiments of the disclosure;

DETAILED DESCRIPTION

Accordingly, systems and methods are described herein ensuring that a user will be able to visualize and consume multiple episodes of a series using a virtual channel. In particular, a media guidance application described herein presents, in an interactive program guide, a virtual content source for binge watching a program series. For example, if a user binge watched the first three episodes of Game of Thrones in one session, then a virtual content source will be presented in the interactive program guide including the next three episodes of Game of Thrones.

Figure 1:
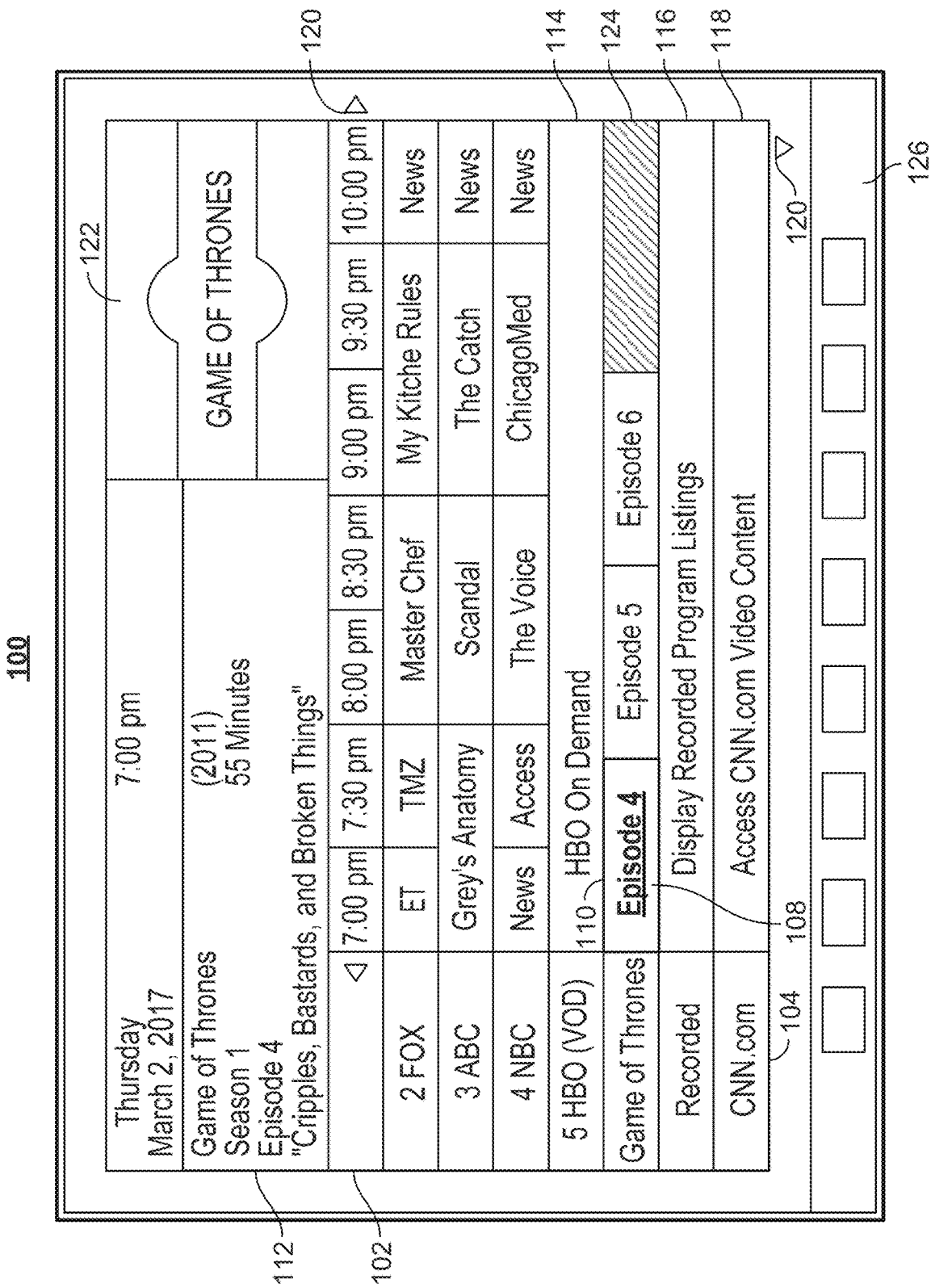
FIG. 1 shows an illustrative example of a display screen for use in accessing media content in accordance with some embodiments of the disclosure.

FIG. 1 shows illustrative display screens that may be used to present, in an interactive program guide, a virtual content source for binge watching a program series. The display screen shown in FIG. 1 may be implemented on any suitable user equipment device or platform. While the display of FIG. 1 is illustrated as a full screen display, it may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

Grid 102 may provide media guidance data for non-linear programming including on-demand listing 114, recorded content listing 116, Internet content listing 118, and virtual content source 124. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, 118, and 124 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Virtual content source 124 may include episodes of a program series the user is binge watching. The media guidance application may determine a program series a user has started watching. The determination of the program series may be performed by retrieving, from a database, a data structure, wherein the data structure comprises multiple indicators. The database and data structure are further described in the detailed description of FIG. 8. In some embodiments, the media guidance application may extract, from the data structure, a first indicator of the multiple indicators corresponding to a program series, wherein the first indicator indicates a number of episodes of the program series the user has watched.

The media guidance application may predict a number of episodes of the program series that the user will binge watch based on tracking an average number of episodes the user binge watches. The prediction of the number of episodes of the program series that the user will binge watch may be performed by extracting, from the data structure, a second indicator of the multiple indicators corresponding to the program series. The second indicator may indicate a first number of binge watching sessions during which the user has watched at least one episode of the program series. In some embodiments, the media guidance application may calculate an average number of episodes the user watches in one binge watching session based on the number of episodes of the program series the user has watched and the first number of binge watching sessions during which the user has watched at least one episode of the program series. In some embodiments, the media guidance application may determine a predicted second number of episodes of the program series that the user will watch during a current binge watching session based on the average number of episodes the user watches in one binge watching session.

The media guidance application may determine multiple episodes of the program series that the user has not watched. In some embodiments, the media guidance application may determine, based on the first indicator of the multiple indicators corresponding to the program series, multiple next episodes of the program series the user has not watched. The media guidance application may select a subset of the multiple episodes of the program series that the user has not watched based on the predicted number of episodes of the program series.

The media guidance application may determine how many episodes the user may want to watch based on the time of day or day of the week. For example, if it is a week day and the user has to go to work the next morning, the media guidance application may predict that the user will want to watch only the episodes that the user can watch before they want to go to sleep. The media guidance application may determine how many episodes the user may want to watch based on the amount of time available in the user's schedule.

The media guidance application may determine how many episodes the user may want to watch based on an established pattern of watching a broadcast program at a specific time. For example, if the user watches the late night local news program every night, the media guidance application may predict that the user will want to watch only the episodes that the user can watch before the start time of the late night local news program.

The media guidance application may create virtual content source 124 including the subset of the multiple episodes of the program series that the user has not watched. In some embodiments, the media guidance application may create virtual content source 124 by retrieving the subset of the multiple next episodes of the program series from multiple content sources. In some embodiments, the multiple content sources may comprise broadcast, on-demand, recorded, and streaming video content sources. The media guidance application may auto play the next episodes without any user intervention.

Display 100 may also include virtual channel 124 simultaneously with multiple media asset indicators corresponding to at least one other content source. The media guidance application may present a virtual channel including episodes of multiple program series. The media guidance application may determine which episodes of the multiple program series to include based on the amount of time available in the user's schedule. For example, if the user has ninety minutes available in their schedule, the media guidance application may select a sixty minute episode of a program series and a thirty minute episode of a different program series.

Virtual channels offer the user a convenient way of visualizing media assets from various sources of content. The media guidance application may generate a virtual channel 124 based on a particular content source, a particular program series, or user preferences. The media guidance application may generate a virtual channel 124 composed of content that may not be broadcast content. For example, a channel that is created for media content that has been recorded may be considered a virtual channel.

Virtual channels may also be generated based on a user's past behavior patterns or moods. For example, if the user has a pattern of binge watching a particular program series when the user is angry, the virtual channel may be generated based on episodes of that particular program series. The media guidance application may present multiple virtual channels 124 that correspond to different behavior patterns or moods.

Virtual channels may also be generated based on recommended program series. Virtual channels may also be generated based on a particular genre. For example, a virtual channel 124 may be generated for sci-fi movies. Virtual channels may also be generated based on program type. For example, a virtual channel 124 may be generated for reality shows. Virtual channels may also be generated based on a particular target audience. For example, a virtual channel 124 may be generated for children. Virtual channels may also be generated based on the viewing history. For example, a virtual channel 124 may be generated including the user's favorite shows presented in the user's typical viewing order.

Display 100 may also include video region 122, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
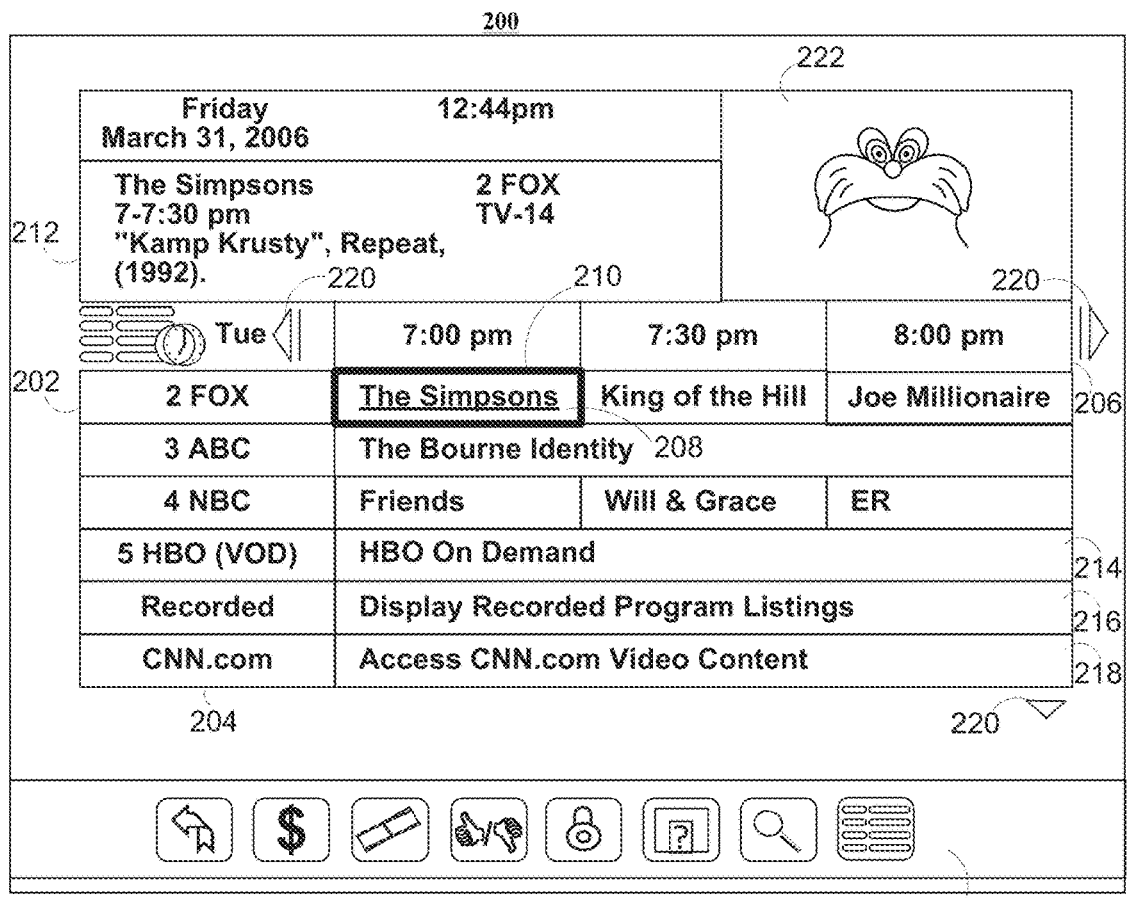
FIG. 2 shows another illustrative example of a display screen used in accessing media content in accordance with some embodiments of the disclosure.
Figure 3:
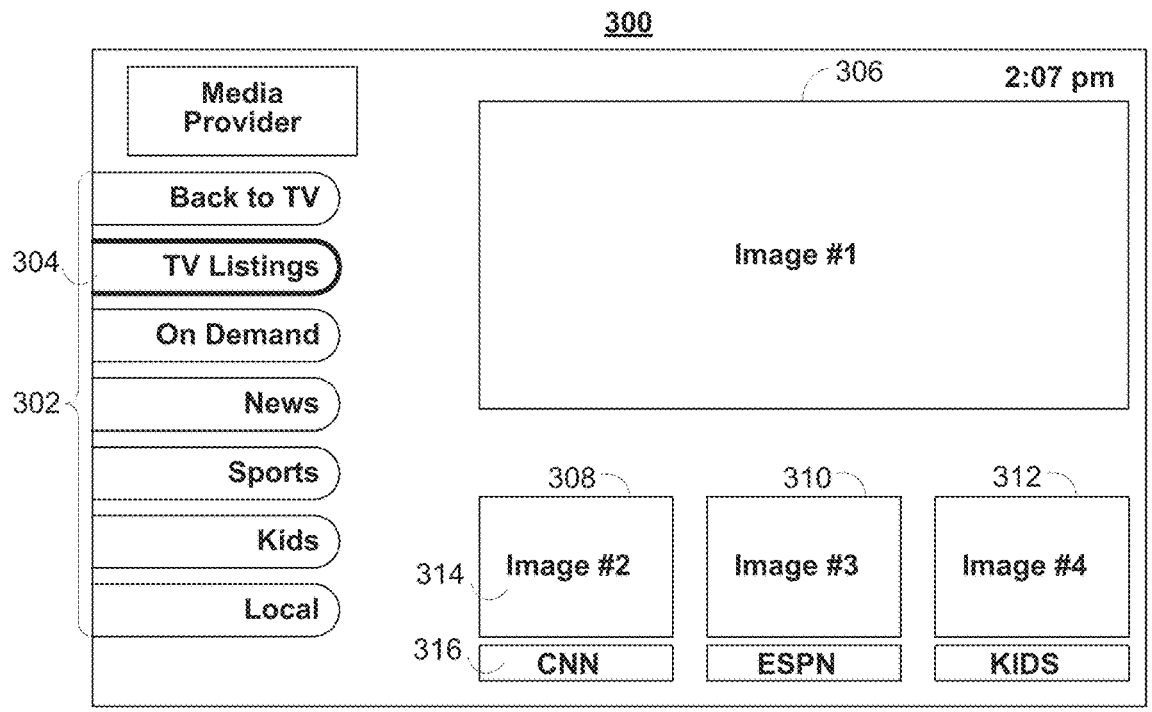
FIG. 3 shows another illustrative example of a display screen used in accessing media content in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to multiple user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
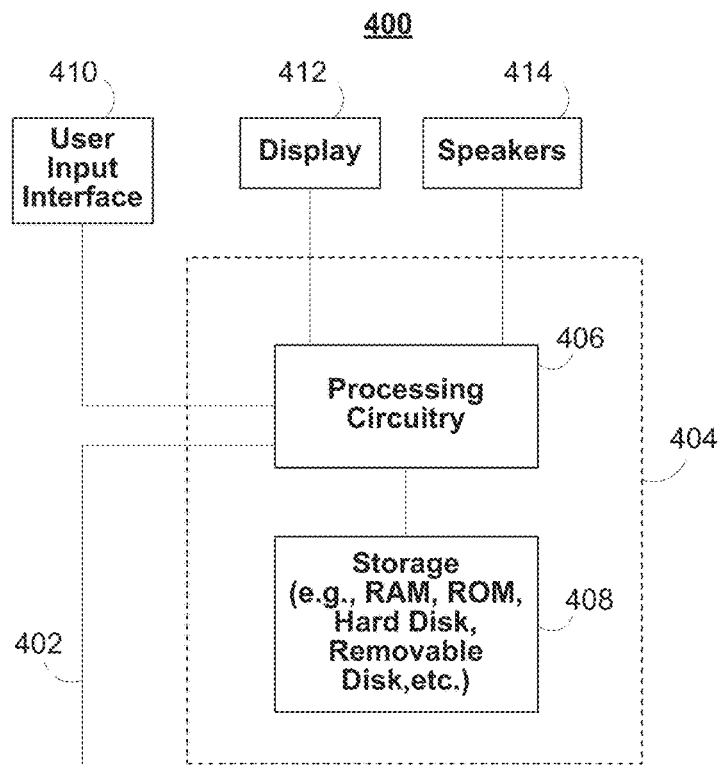
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 308 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
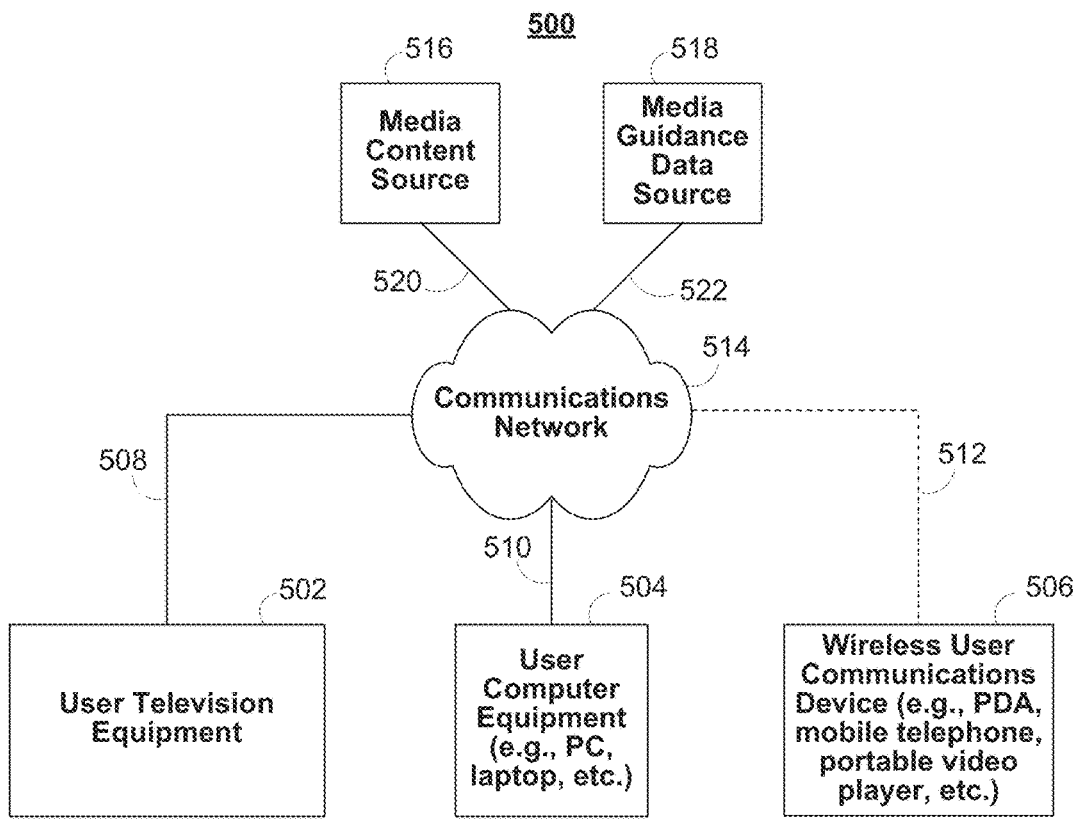
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

As referred herein, the term "virtual channel" refers to a customized channel generated on an interactive program guide including content from at least two different sources. Virtual channels offer the user a convenient way of visualizing media assets from various sources of content. In some embodiments, control circuitry 404 may generate a virtual channel based on a particular content source, a particular program series, or user preferences. In some embodiments, control circuitry 404 may generate a virtual channel composed of content that may not be broadcast content. For example, a channel that is created for media content that has been recorded may be considered a virtual channel. The various sources of content may include broadcast, on-demand, recorded, and streaming video content sources.

As referred herein, the term "binge watching" or "binging" refers to watching multiple episodes of a program series consecutively in one session. For example, watching three episodes of a program series with no or very limited interruption in between each episode may be considered binge watching or binging. A user may be able to binge watch a program series on a virtual channel. Virtual channels offer the user a convenient way of visualizing the media assets the user may want to binge watch.

FIG. 6 shows an illustrative display screen that may be used to present, in an interactive program guide, a virtual channel for binge watching a program series. The display screen shown in FIG. 6 may be implemented on any suitable user equipment device or platform. While the display of FIG. 6 is illustrated as a full screen display, it may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

Another display arrangement for presenting, in an interactive program guide, a virtual channel for binge watching a program series is shown in FIG. 6. FIG. 6 shows illustrative grid of a program listings display 600 arranged by time and channel that also enables access to different types of content in a single display. Display 600 may include grid 602 with: (1) a column of channel/content type identifiers 604, where each channel/content type identifier (which is a cell in the column) identifies a different channel or content type available; and (2) a row of time identifiers 606, where each time identifier (which is a cell in the row) identifies a time block of programming. Grid 602 also includes cells of program listings, such as program listing 608, where each listing provides the title of the program provided on the listing's associated channel and time. With a user input device, a user can select program listings by moving highlight region 610. Information relating to the program listing selected by highlight region 610 may be provided in program information region 612. Region 612 may include, for example, the program title, the program description, the time the program is provided (if applicable), the channel the program is on (if applicable), the program's rating, and other desired information.

Grid 602 may provide media guidance data for non-linear programming including on-demand listing 614, recorded content listing 616, Internet content listing 618, and virtual channel 624. A display combining media guidance data for content from different types of content sources is sometimes referred to as a "mixed-media" display. Various permutations of the types of media guidance data that may be displayed that are different than display 600 may be based on user selection or guidance application definition (e.g., a display of only recorded and broadcast listings, only on-demand and broadcast listings, etc.). As illustrated, listings 614, 616, 618, and 624 are shown as spanning the entire time block displayed in grid 602 to indicate that selection of these listings may provide access to a display dedicated to on-demand listings, recorded listings, or Internet listings, respectively. In some embodiments, listings for these content types may be included directly in grid 602. Additional media guidance data may be displayed in response to the user selecting one of the navigational icons 620. (Pressing an arrow key on a user input device may affect the display in a similar manner as selecting navigational icons 620.)

Virtual channel 624 may include episodes of a program series the user is binge watching. Virtual channel 624 is described in more detail in the description of virtual channel 124 of FIG. 1. In some embodiments, control circuitry 404 may receive a user selection of a media asset using user input interface 410.

In some embodiments, control circuitry 404 may determine a start time of the media asset. In some embodiments, control circuitry 404 may extract, from a data structure in storage 408, a second indicator of the multiple indicators corresponding to the media asset. In some embodiments, the second indicator may indicate a start time of the media asset. In some embodiments, control circuitry 404 may determine a length of time between a current time and the start time of the media asset.

In some embodiments, control circuitry 404 may determine a number of episodes of the program series the user can watch in the length of time before the start time of the media asset. In some embodiments, control circuitry 404 may extract, from a data structure in storage 408, a third indicator of the multiple indicators corresponding to the program series. In some embodiments, the third indicator may indicate an average length of each of the multiple next episodes of the program series the user has not watched. In some embodiments, control circuitry 404 may determine a number of episodes of the program series the user can watch in the length of time before the start time of the media asset based on the average length of each of the multiple next episodes of the program series the user has not watched.

In some embodiments, control circuitry 404 may select a subset of the multiple episodes of the program series that the user has not watched based on the number of episodes the user can watch.

In some embodiments, the number of episodes the user can watch in the length of time is greater than the multiple next episodes of the program series that the user has not watched. In some embodiments, control circuitry 404 may extract, from the data structure in storage 408, a fourth indicator of the multiple indicators corresponding to the program series. In some embodiments, the fourth indicator may indicate a related program series the user has not watched. In some embodiments, control circuitry 404 may select a second subset of multiple episodes of the related program series based on the number of episodes of the program series the user can watch in the length of time and the multiple next episodes of the program series the user has not watched. In some embodiments, control circuitry 404 may create the virtual channel 624 including the subset of the multiple next episodes of the program series and the second subset of the multiple episodes of the related program series. In some embodiments, the subset of the multiple next episodes of the program series and the second subset of the multiple episodes of the related program series are presented in sequence. In some embodiments, the subset of the multiple next episodes of the program series is presented first.

In some embodiments, control circuitry 404 may create the virtual channel 624 including the media asset the user will watch at the start time. In some embodiments, the subset of the multiple next episodes of the program series and the media asset the user will watch at the start time are presented in sequence. In some embodiments, the subset of the multiple next episodes of the program series is presented first.

Display 600 may also include video region 622, and options region 626. Video region 622 may allow the user to view and/or preview programs that are currently available, will be available, or were available to the user. The content of video region 622 may correspond to, or be independent from, one of the listings displayed in grid 602. Grid displays including a video region are sometimes referred to as picture-in-guide (PIG) displays.

Options region 626 may allow the user to access different types of content, media guidance application displays, and/or media guidance application features. Options region 626 may be part of display 600 (and other display screens described herein), or may be invoked by a user by selecting an on-screen option or pressing a dedicated or assignable button on a user input device. The selectable options within options region 626 may concern features related to program listings in grid 602 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

FIGS. 7-11 present processes for control circuitry (e.g., control circuitry 404) to present, in an interactive program guide, a virtual content source for binge watching a program series in accordance with some embodiments of the disclosure. In some embodiments this algorithm may be encoded on to non-transitory storage medium (e.g., storage device 408) as a set of instructions to be decoded and executed by processing circuitry (e.g., processing circuitry 406). Processing circuitry may in turn provide instructions to other sub-circuits contained within control circuitry 404, such as the tuning, video generating, encoding, decoding, encrypting, decrypting, scaling, analog/digital conversion circuitry, and the like.

Figure 7:
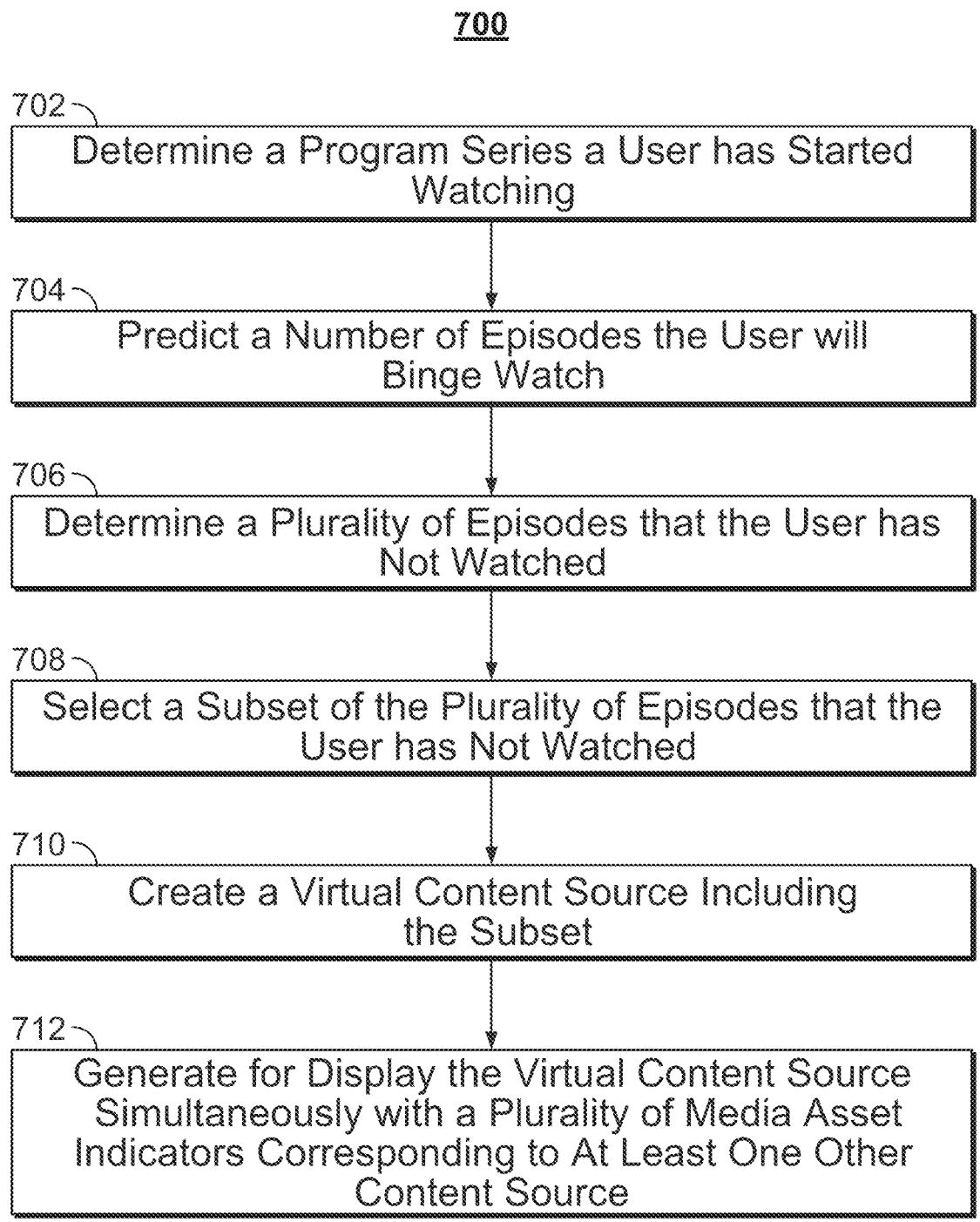
FIG. 7 is a flowchart of illustrative steps for in accordance with some embodiments of the disclosure.

The flowchart in FIG. 7 describes a process implemented on control circuitry (e.g., control circuitry 404) to present, in an interactive program guide, a virtual content source for binge watching a program series in accordance with some embodiments of the disclosure.

At step 702, the process implemented on control circuitry 404 to present, in an interactive program guide, a virtual content source for binge watching a program series will begin based on determining a program series a user has started watching. For example, the user may have started watching Game of Thrones in a previous watching session. In some embodiments, this may be done either directly or indirectly in response to a user action or input (e.g., from signals received by control circuitry 404 or user input interface 410). For example, the process may begin directly in response to control circuitry 404 receiving signals from user input interface 410, or control circuitry 404 may prompt the user to confirm their input using a display (e.g., by generating a prompt to be displayed on display 412) prior to running the algorithm.

At step 704, control circuitry 404 proceeds to predict a number of episodes the user will binge watch. For example, the user may have watched three episodes of Game of Thrones in a previous watching session and may desire to binge watch the next three episodes.

At step 706, control circuitry 404 proceeds to determine multiple episodes the user has not watched watch. For example, if the user has watched the first three episodes of Game of Thrones in a previous watching session, the user has not watched the episodes of Game of Thrones after episode three.

At step 708, control circuitry 404 proceeds to select a subset of the multiple episodes that the user has not watched. For example, control circuitry 304 may select episodes four, five, and six as the subset of the multiple episodes of Game of Thrones that the user has not watched.

At step 710, control circuitry 404 proceeds to create a virtual content source including the subset. For example, the virtual content source for Game of Thrones may include the selected episodes of four, five, and six of Game of Thrones.

At step 712, control circuitry 404 proceeds to generate for display the virtual content source simultaneously with multiple media asset indicators corresponding to at least one other content source. For example, display 100 may include a virtual content source 124 for Game of Thrones including the selected episodes of four, five, and six of Game of Thrones.

It is contemplated that the descriptions of FIG. 7 may be used with any other embodiment of this disclosure. In addition, the descriptions described in relation to the algorithm of FIG. 7 may be done in alternative orders or in parallel to further the purposes of this disclosure. Furthermore, it should be noted that the process of FIG. 7 may be implemented on a combination of appropriately configured software and hardware, and that any of the devices or equipment discussed in relation to FIGS. 4-5 could be used to implement one or more portions of the process.

Figure 8:
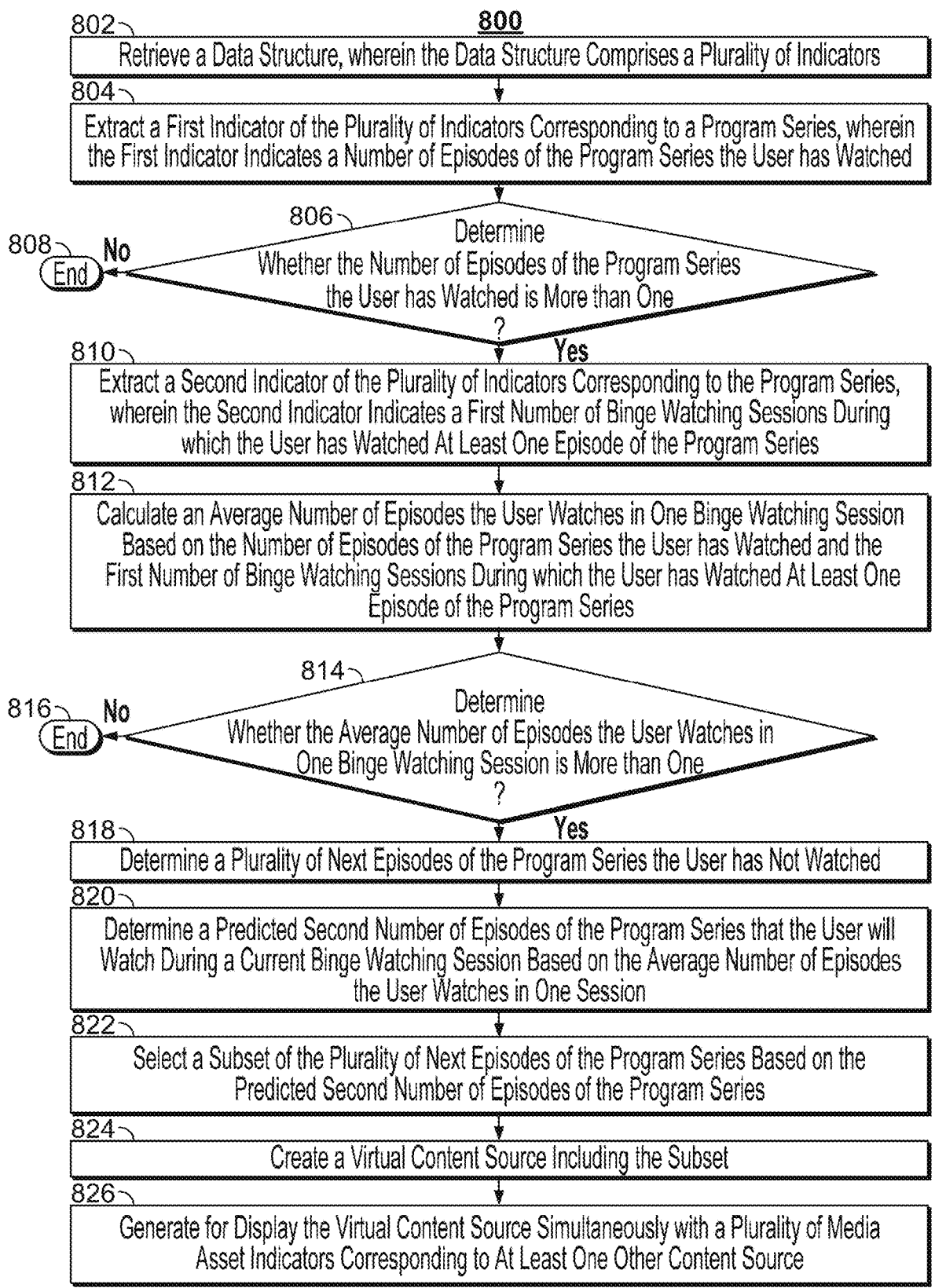
FIG. 8 is a flowchart of illustrative steps for in accordance with some embodiments of the disclosure.

The flowchart in FIG. 8 describes a process implemented on control circuitry (e.g., control circuitry 404) to present, in an interactive program guide, a virtual content source for binge watching a program series in accordance with some embodiments of the disclosure.

At step 802, the process implemented on control circuitry 404 to present, in an interactive program guide, a virtual content source for binge watching a program series will begin based on retrieving a data structure from storage device 408, wherein the data structure comprises multiple indicators. In some embodiments, this may be done either directly or indirectly in response to a user action or input (e.g., from signals received by control circuitry 404 or user input interface 410). For example, the process may begin directly in response to control circuitry 404 receiving signals from user input interface 410, or control circuitry 404 may prompt the user to confirm their input using a display (e.g., by generating a prompt to be displayed on display 412) prior to running the algorithm. In some embodiments, the data structure may be retrieved from storage 408.

At step 804, control circuitry 404 proceeds to extract a first indicator of the multiple indicators corresponding to a program series, wherein the first indicator indicates a number of episodes of the program series the user has watched. For example, the first indicator may indicate that the user may have started watching Game of Thrones in a previous watching session. For example, the first indicator may also indicate that the user has watched the first three episodes of Game of Thrones in a previous watching session.

At step 806, control circuitry 404 proceeds to determine whether the number of episodes of the program series the user has watched is more than one. For example, if the user has watched the first three episodes of Game of Thrones, then control circuitry 404 may determine that the number of episodes of the program series that the user has watched is more than one.

If control circuitry 404 determines that the number of episodes of the program series that the user has watched is not more than one, then process 800 may proceed to step 808. At step 808, control circuitry 404 ends the process.

If control circuitry 404 determines that the number of episodes of the program series that the user has watched is more than one, then process 800 may proceed to step 810. At step 810, control circuitry 404 proceeds to extract a second indicator of the multiple indicators corresponding to the program series, wherein the second indicator indicates a first number of binge watching sessions during which the user has watched at least one episode of the program series. For example, if the user watched the first three episodes of Game of Thrones in one watching session, then control circuitry 404 may determine that the number of binge watching sessions during which the user has watched at least one episode of Game of Thrones is one.

At step 812, control circuitry 404 proceeds to calculate an average number of episodes the user watches in one binge watching session based on the number of episodes of the program series the user has watched and the first number of binge watching sessions during which the user has watched at least one episode of the program series. For example, if the user has watched the first three episodes of Game of Thrones in one binge watching session, then control circuitry 404 may calculate the average number of episodes the user watches in one binge watching session to be three. For example, if the user has watched the first 12 episodes of Game of Thrones in two binge watching sessions, then control circuitry 404 may calculate the average number of episodes the user watches in one binge watching session to be six.

At step 814, control circuitry 404 proceeds to determine whether the average number of episodes the user watches in one binge watching session is more than one. For example, if the average number of episodes of Game of Thrones the user watches in one binge watching session is three, then control circuitry 404 may determine that the average number of episodes the user watches in one binge watching session is more than one.

If control circuitry 404 determines that the average number of episodes the user watches in one binge watching session is not more than one, then process 800 may proceed to step 816. At step 816, control circuitry 404 proceeds to end the process.

If control circuitry 404 determines that the average number of episodes the user watches in one binge watching session is more than one, then process 800 may proceed to step 818. At step 818, control circuitry 404 proceeds to determine multiple next episodes of the program series the user has not watched. For example, if the user has watched the first three episodes of Game of Thrones in a previous watching session, control circuitry 404 may determine that the user has not watched the episodes of Game of Thrones after episode three.

At step 820, control circuitry 404 proceeds to determine a predicted second number of episodes of the program series that the user will watch during a current binge watching session based on the average number of episodes the user watches in one session. For example, if the average number of episodes the user watches in one binge watching session of Game of Thrones is three, then control circuitry may determine that the predicted second number of episodes of Game of Thrones that the user will watch during the current binge watching session is three. In some embodiments, control circuitry 404 may determine the predicted second number of episodes of the program series that the user will watch during the current binge watching session based on the time of day or day of the week associated with a prior binge watching session.

At step 822, control circuitry 404 proceeds to select a subset of the multiple next episodes of the program series based on the predicted second number of episodes of the program series. For example, if the predicted second number of episodes of Game of Thrones the user will watch is three, then control circuitry 404 may select episodes four, five, and six as the subset of the multiple episodes of Game of Thrones that the user has not watched.

In some embodiments, control circuitry 404 may extract, from the data structure, a third indicator of the multiple indicators corresponding to the program series. The third indicator may indicate a third number of binge watching sessions during which the user has watched at least two episodes of the program series. In some embodiments, control circuitry 404 may determine that the third number of binge watching sessions during which the user has watched at least two episodes of the program series is more than one. In some embodiments, control circuitry 404 may determine, based on the first indicator of the multiple indicators corresponding to the program series, the multiple next episodes of the program series the user has not watched. In some embodiments, control circuitry 404 may determine the predicted second number of episodes of the program series that the user will watch during the current binge watching session based on a second average number of episodes the user watched during the third binge watching sessions.

In some embodiments, control circuitry 404 may extract, from the data structure, a fourth indicator of the multiple indicators corresponding to the program series. The fourth indicator may indicate an average length of time the user spends watching the program series during the first binge watching sessions. In some embodiments, control circuitry 404 may determine the predicted second number of episodes of the program series that the user will watch during the current binge watching session based on the average length of time.

In some embodiments, the average number of episodes the user watches in one binge watching session may be more than the multiple next episodes of the program series the user has not watched. In some embodiments, control circuitry 404 may extract, from the data structure, a fifth indicator of the multiple indicators corresponding to the program series. The fifth indicator may indicate a related program series the user has not watched. In some embodiments, the control circuitry 404 may determine a third number of episodes of the related program series that the user will watch based on the difference between the average number of episodes the user watches in one session and the multiple next episodes of the program series the user has not watched. In some embodiments, control circuitry 404 may select a second subset of multiple episodes of the related program series based on the third number of episodes of the related program series that the user will watch.

At step 824, control circuitry 404 proceeds to create a virtual content source including the subset. For example, the virtual content source for Game of Thrones may include the selected episodes of four, five, and six of Game of Thrones. In some embodiments, control circuitry 404 may create the virtual content source by retrieving the subset of the multiple next episodes of the program series from multiple content sources. In some embodiments, the multiple content sources may comprise broadcast, on-demand, recorded, and streaming video content sources. In some embodiments, the control circuitry 404 may create the virtual content source including the first subset of the multiple next episodes of the program series and the second subset of the multiple episodes of the related program series. The first subset of the multiple next episodes of the program series and the second subset of the multiple episodes of the related program series may be presented in sequence. The first subset of the multiple next episodes of the program series may be presented first.

At step 826, control circuitry 404 proceeds to generate for display the virtual content source simultaneously with multiple media asset indicators corresponding to at least one other content source. For example, display 100 may include a virtual content source 124 for Game of Thrones including the selected episodes of four, five, and six of Game of Thrones.

It is contemplated that the descriptions of FIG. 8 may be used with any other embodiment of this disclosure. In addition, the descriptions described in relation to the algorithm of FIG. 8 may be done in alternative orders or in parallel to further the purposes of this disclosure. Furthermore, it should be noted that the process of FIG. 8 may be implemented on a combination of appropriately configured software and hardware, and that any of the devices or equipment discussed in relation to FIGS. 4-5 could be used to implement one or more portions of the process.

Figure 9:
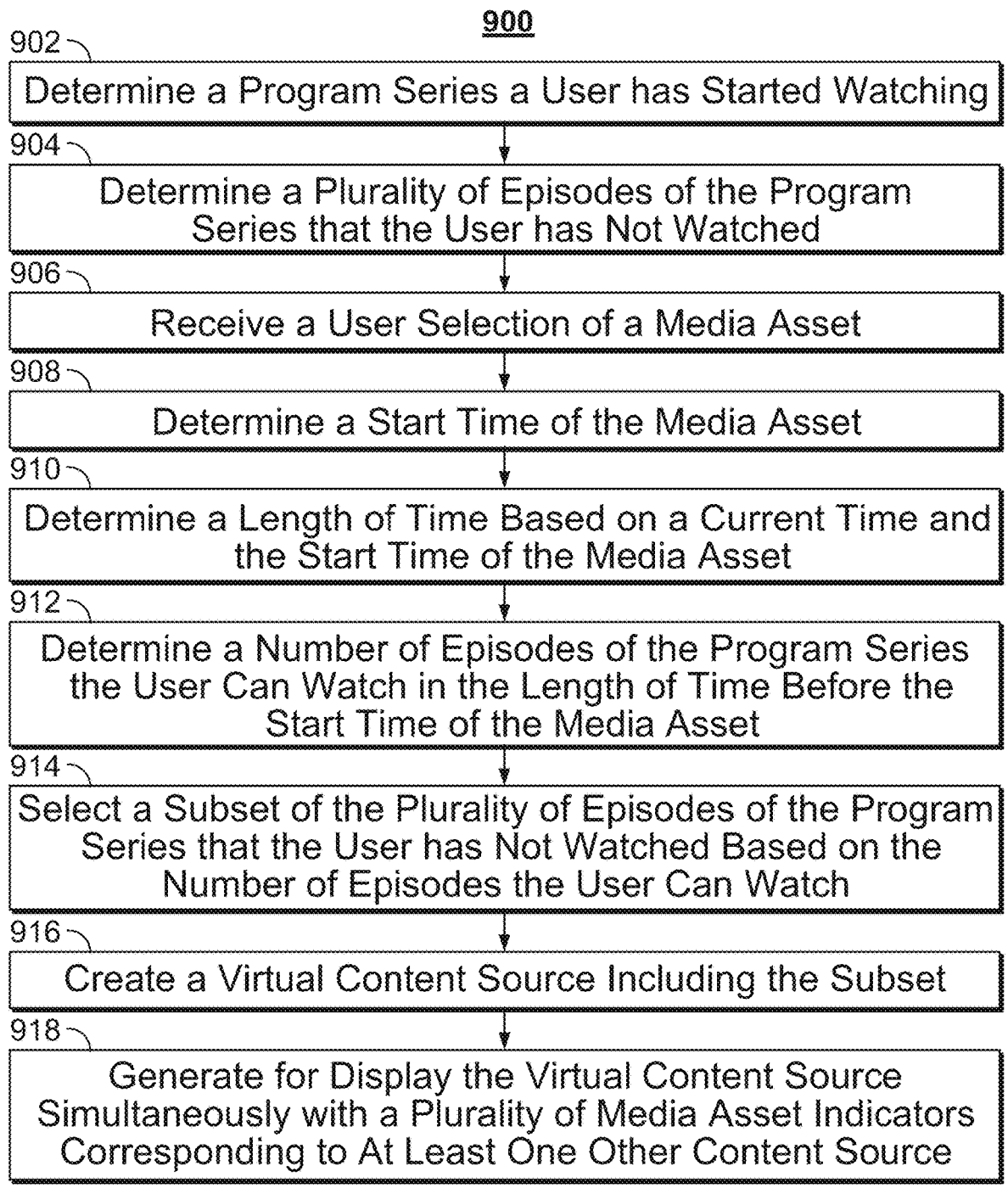
FIG. 9 is a flowchart of illustrative steps for in accordance with some embodiments of the disclosure.

The flowchart in FIG. 9 describes a process implemented on control circuitry (e.g., control circuitry 404) to present, in an interactive program guide, a virtual content source for binge watching a program series in accordance with some embodiments of the disclosure.

At step 902, the process implemented on control circuitry 404 to present, in an interactive program guide, a virtual content source for binge watching a program series will begin based on determining a program series a user has started watching. For example, the user may have started watching Game of Thrones in a previous watching session. In some embodiments, this may be done either directly or indirectly in response to a user action or input (e.g., from signals received by control circuitry 404 or user input interface 410). For example, the process may begin directly in response to control circuitry 404 receiving signals from user input interface 410, or control circuitry 404 may prompt the user to confirm their input using a display (e.g., by generating a prompt to be displayed on display 412) prior to running the algorithm.

At step 904, control circuitry 404 proceeds to determine multiple episodes of the program series that the user has not watched. For example, if the user has watched the first three episodes of Game of Thrones in a previous watching session, the user has not watched the episodes of Game of Thrones after episode three.

At step 906, control circuitry 404 proceeds to receive a user selection of a media asset. In some embodiments, the user may use user input interface 310 to select the media asset. For example, the user may select the News from a channel.

At step 908, control circuitry 404 proceeds to determine a start time of the media asset. For example, control circuitry 404 may determine that the start time for the News is 10 PM.

At step 910, control circuitry 404 proceeds to determine a length of time based on a current time and the start time of the media asset. For example, if the current time is 7 PM and the start time of the media asset is 10 PM, then control circuitry 404 may determine that the length of time based on the current time and the start time of the media asset is three hours.

At step 912, control circuitry 404 proceeds to determine a number of episodes of the program series the user can watch in the length of time before the start time of the media asset. For example, if the length of each episode of Game of Thrones is one hour, then control circuitry 404 may determine that the number of episodes of the program series the user can watch in the length of time before the start time of the media asset is three.

At step 914, control circuitry 404 proceeds to select a subset of the multiple episodes of the program series that the user has not watched based on the number of episodes the user can watch. For example, if the number of episodes of Game of Thrones the user will can watch is three, then control circuitry 404 may select episodes four, five, and six as the subset of the multiple episodes of Game of Thrones that the user has not watched.

At step 916, control circuitry 404 proceeds to create a virtual content source including the subset. For example, the virtual content source for Game of Thrones may include the selected episodes of four, five, and six of Game of Thrones.

At step 918, control circuitry 404 proceeds to generate for display the virtual content source simultaneously with multiple media asset indicators corresponding to at least one other content source. For example, display 600 may include a virtual content source 624 for Game of Thrones including the selected episodes of four, five, and six of Game of Thrones.

It is contemplated that the descriptions of FIG. 9 may be used with any other embodiment of this disclosure. In addition, the descriptions described in relation to the algorithm of FIG. 9 may be done in alternative orders or in parallel to further the purposes of this disclosure. Furthermore, it should be noted that the process of FIG. 9 may be implemented on a combination of appropriately configured software and hardware, and that any of the devices or equipment discussed in relation to FIGS. 4-5 could be used to implement one or more portions of the process.

Figure 10:
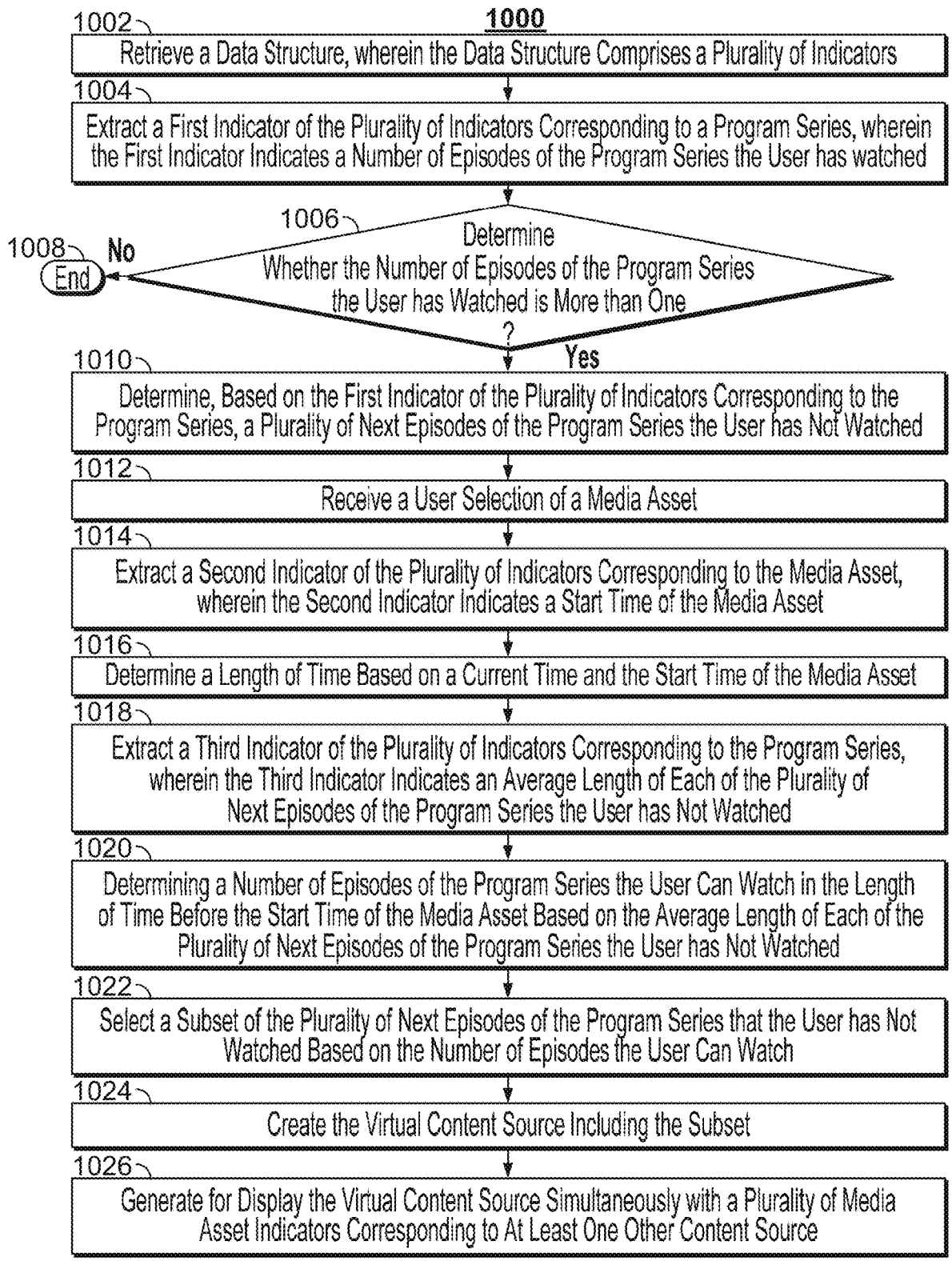
FIG. 10 is a flowchart of illustrative steps for in accordance with some embodiments of the disclosure.

The flowchart in FIG. 10 describes a process implemented on control circuitry (e.g., control circuitry 404) to present, in an interactive program guide, a virtual content source for binge watching a program series in accordance with some embodiments of the disclosure.

At step 1002, the process implemented on control circuitry 404 to present, in an interactive program guide, a virtual content source for binge watching a program series will begin based on retrieving a data structure, wherein the data structure comprises multiple indicators. In some embodiments, this may be done either directly or indirectly in response to a user action or input (e.g., from signals received by control circuitry 404 or user input interface 410). For example, the process may begin directly in response to control circuitry 304 receiving signals from user input interface 410, or control circuitry 404 may prompt the user to confirm their input using a display (e.g., by generating a prompt to be displayed on display 312) prior to running the algorithm. In some embodiments, the data structure may be retrieved from storage 408.

At step 1004, control circuitry 404 proceeds to extract a first indicator of the multiple indicators corresponding to a program series, wherein the first indicator indicates a number of episodes of the program series the user has watched. For example, the first indicator may indicate that the user may have started watching Game of Thrones in a previous watching session. For example, the first indicator may also indicate that the user has watched the first three episodes of Game of Thrones in a previous watching session.

At step 1006, control circuitry 404 proceeds to determine whether the number of episodes of the program series the user has watched is more than one. For example, if the user has watched the first three episodes of Game of Thrones, then control circuitry 404 may determine that the number of episodes of the program series that the user has watched is more than one.

If control circuitry 404 determines that the number of episodes of the program series that the user has watched is not more than one, then process 1000 may proceed to step 1008. At step 1008, control circuitry 404 proceeds to end the process.

If control circuitry 404 determines that the number of episodes of the program series that the user has watched is more than one, then process 1000 may proceed to step 1010. At step 1010, control circuitry 404 proceeds to determine, based on the first indicator of the multiple indicators corresponding to the program series, multiple next episodes of the program series the user has not watched. For example, if the user has watched the first three episodes of Game of Thrones in a previous watching session, control circuitry 404 may determine that the user has not watched the episodes of Game of Thrones after episode three.

At step 1012, control circuitry 404 proceeds to receive a user selection of a media asset. In some embodiments, the user may use user input interface 410 to select the media asset. For example, the user may select the News from a channel.

At step 1014, control circuitry 404 proceeds to extract a second indicator of the multiple indicators corresponding to the media asset, wherein the second indicator indicates a start time of the media asset. For example, control circuitry 404 may extract from the second indicator of the multiple indicators corresponding to the News that the start time for the News is 10 PM.

At step 1016, control circuitry 404 proceeds to determine a length of time based on a current time and the start time of the media asset. For example, if the current time is 7 PM and the start time of the media asset is 10 PM, then control circuitry 404 may determine that the length of time based on the current time and the start time of the media asset is three hours.

At step 1018, control circuitry 404 proceeds to extract a third indicator of the multiple indicators corresponding to the program series, wherein the third indicator indicates an average length of each of the multiple next episodes of the program series. For example, if the length of each episode of Game of Thrones is one hour, then control circuitry 404 may extract from the third indicator that the average length of each episode of Game of Thrones that the user has not watched is one hour.

At step 1020, control circuitry 404 proceeds to determine a number of episodes of the program series the user can watch in the length of time before the start time of the media asset based on the average length of each of the multiple next episodes of the program series the user has not watched. For example, if the average length of each episode of Game of Thrones is one hour, then control circuitry 404 may determine that the number of episodes of Game of Thrones the user can watch in the length of time before the start time of the News is three.

At step 1022, control circuitry 404 proceeds to select a subset of the multiple next episodes of the program series that the user has not watched based on the number of episodes the user can watch. For example, if the number of episodes of Game of Thrones the user will can watch is three, then control circuitry 404 may select episodes four, five, and six as the subset of the multiple episodes of Game of Thrones that the user has not watched.

In some embodiments, the number of episodes the user can watch in the length of time is greater than the multiple next episodes of the program series that the user has not watched. In some embodiments, control circuitry 404 may extract, from the data structure, a fourth indicator of the multiple indicators corresponding to the program series. In some embodiments, the fourth indicator may indicate a related program series the user has not watched. In some embodiments, control circuitry 404 may select a second subset of multiple episodes of the related program series based on the number of episodes of the program series the user can watch in the length of time and the multiple next episodes of the program series the user has not watched.

At step 1024, control circuitry 404 proceeds to create the virtual content source including the subset. For example, the virtual content source for Game of Thrones may include the selected episodes of four, five, and six of Game of Thrones. In some embodiments, control circuitry 404 may create the virtual content source by retrieving the subset of the multiple next episodes of the program series from a multiple content sources. In some embodiments, the multiple content sources may comprise broadcast, on-demand, recorded, and streaming video content sources. In some embodiments, control circuitry 404 may create the virtual content source including the subset of the multiple next episodes of the program series and the second subset of the multiple episodes of the related program series. In some embodiments, the subset of the multiple next episodes of the program series and the second subset of the multiple episodes of the related program series are presented in sequence. In some embodiments, the subset of the multiple next episodes of the program series is presented first.

In some embodiments, control circuitry 404 may create the virtual content source including the media asset the user will watch at the start time. In some embodiments, the subset of the multiple next episodes of the program series and the media asset the user will watch at the start time are presented in sequence. In some embodiments, the subset of the multiple next episodes of the program series is presented first.

In some embodiments, the media asset corresponds to an episode of a related program series related to the program series. In some embodiments, control circuitry 404 may create the virtual content source including a recent episode of the related program series. In some embodiments, the subset of the multiple next episodes of the program series and the recent episodes of the related program series are presented in sequence. In some embodiments, the subset of the multiple next episodes of the program series is presented first.

At step 1026, control circuitry 404 proceeds to generate for display the virtual content source simultaneously with multiple media asset indicators corresponding to at least one other content source. For example, display 600 may include virtual content source 624 for Game of Thrones including the selected episodes of four, five, and six of Game of Thrones.

It is contemplated that the descriptions of FIG. 10 may be used with any other embodiment of this disclosure. In addition, the descriptions described in relation to the algorithm of FIG. 10 may be done in alternative orders or in parallel to further the purposes of this disclosure. Furthermore, it should be noted that the process of FIG. 10 may be implemented on a combination of appropriately configured software and hardware, and that any of the devices or equipment discussed in relation to FIGS. 4-5 could be used to implement one or more portions of the process.

Figure 11:
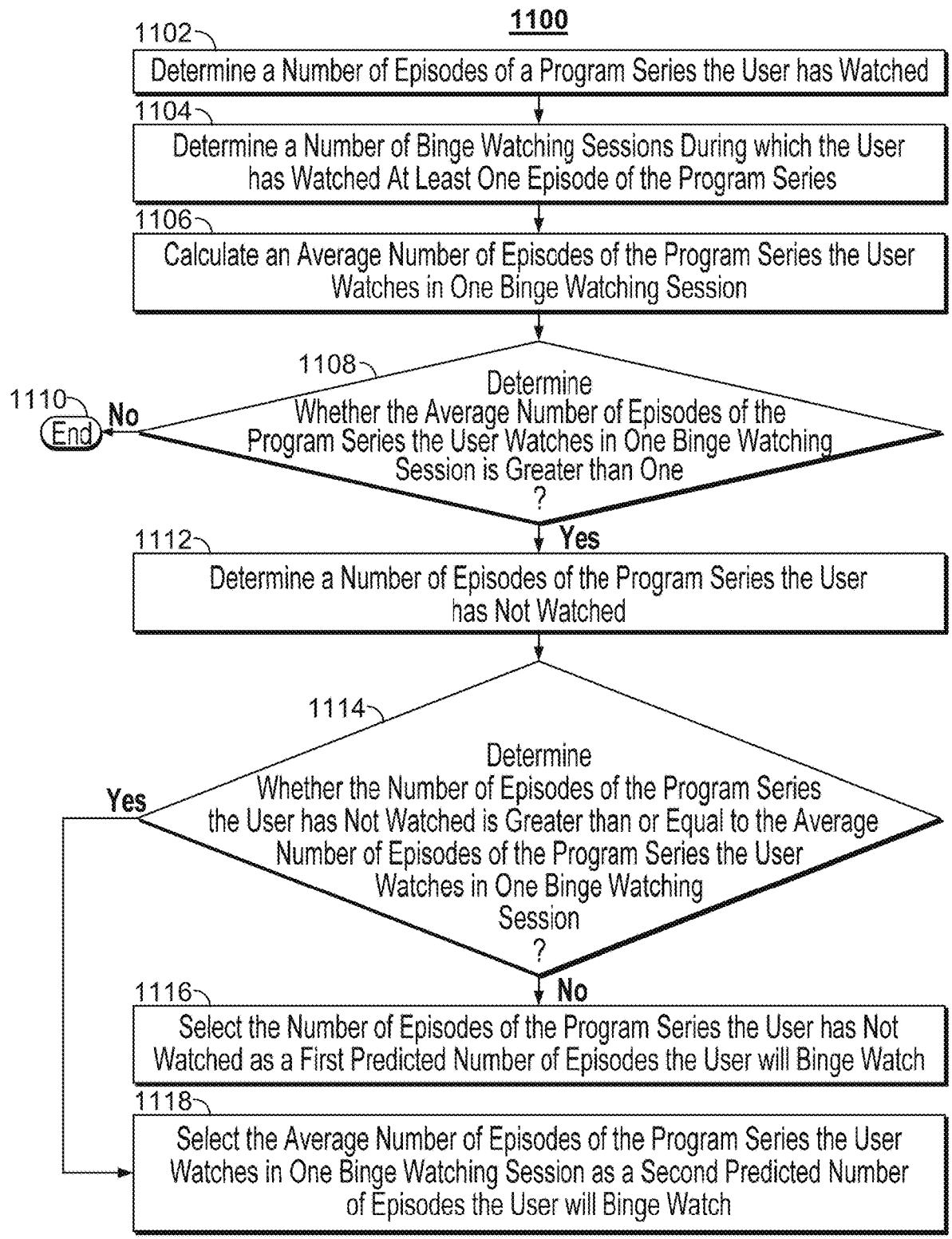
FIG. 11 is a flowchart of illustrative steps for in accordance with some embodiments of the disclosure.

The flowchart in FIG. 11 describes a process implemented on control circuitry (e.g., control circuitry 404) to present, in an interactive program guide, a virtual content source for binge watching a program series in accordance with some embodiments of the disclosure.

At step 1102, the process implemented on control circuitry 404 to present, in an interactive program guide, a virtual content source for binge watching a program series will begin based on determining a number of episodes of a program series the user has watched. For example, the user may have watched three episodes of Game of Thrones in a previous watching session. In some embodiments, this may be done either directly or indirectly in response to a user action or input (e.g., from signals received by control circuitry 404 or user input interface 410). For example, the process may begin directly in response to control circuitry 404 receiving signals from user input interface 410, or control circuitry 404 may prompt the user to confirm their input using a display (e.g., by generating a prompt to be displayed on display 412) prior to running the algorithm.

At step 1104, control circuitry 404 proceeds to determine a number of binge watching sessions during which the user has watched at least one episode of the program series. For example, if the user watched the first three episodes of Game of Thrones in one watching session, then control circuitry 404 may determine that the number of binge watching sessions during which the user has watched at least one episode of Game of Thrones is one.

At step 1106, control circuitry 404 proceeds to calculate an average number of episodes of the program series the user watches in one binge watching session. For example, if the user has watched the first three episodes of Game of Thrones in one binge watching session, then control circuitry 404 may calculate the average number of episodes the user watches in one binge watching session to be three. For example, if the user has watched the first 12 episodes of Game of Thrones in two binge watching sessions, then control circuitry 404 may calculate the average number of episodes the user watches in one binge watching session to be six.

At step 1108, control circuitry 404 proceeds to determine whether the average number of episodes of the program series the user watches in one binge watching session is greater than one. For example, if the average number of episodes of Game of Thrones the user watches in one binge watching session is three, then control circuitry 404 may determine that the average number of episodes the user watches in one binge watching session is more than one.

If control circuitry 404 determines that the average number of episodes the user watches in one binge watching session is not more than one, then process 1100 may proceed to step 1110. At step 1110, control circuitry 404 proceeds to end the process.

If control circuitry 404 determines that the average number of episodes the user watches in one binge watching session is more than one, then process 1100 may proceed to step 1112. At step 1112, control circuitry 404 proceeds to determine a number of episodes of the program series the user has not watched. For example, if the user has watched the first three episodes of Game of Thrones in a previous watching session, control circuitry 404 may determine that the user has not watched the episodes of Game of Thrones after episode three.

At step 1114, control circuitry 404 proceeds to determine whether the number of episodes of the program series the user has not watched is greater than or equal to the average number of episodes of the program series the user watches in one binge watching session. In response to determining that the number of episodes of the program series the user has not watched is not greater than or equal to the average number of episodes of the program series the user watches in one binge watching session, control circuitry 404 proceeds to step 1116. In response to determining that the number of episodes of the program series the user has not watched is greater than or equal to the average number or episodes of the program series the user watched in one binge watching session, control circuitry proceeds to step 1118.

At step 1116, control circuitry 404 proceeds to select the number of episodes of the program series the user has not watched as a first predicted number of episodes the user will binge watch. For example, if the average number of episodes of Game of Thrones the user watches in one binge watching session is three and the episodes of Game of Thrones the user has not watched is only the last two episodes, then control circuitry 404 may proceed to select two as the first predicted number of episodes of Game of Thrones the user will binge watch.

At step 1118, control circuitry 404 proceeds to select the average number of episodes of the program series the user watches in one binge watching session as a second predicted number of episodes the user will binge watch. For example, if the average number of episodes of Game of Thrones the user watches in one binge watching session is three and the number of episodes of Game of Thrones the user has not watched is four episodes, then control circuitry 404 may proceed to select three as the second predicted number of episodes of Game of Thrones the user will binge watch.

It is contemplated that the descriptions of FIG. 11 may be used with any other embodiment of this disclosure. In addition, the descriptions described in relation to the algorithm of FIG. 11 may be done in alternative orders or in parallel to further the purposes of this disclosure. Furthermore, it should be noted that the process of FIG. 11 may be implemented on a combination of appropriately configured software and hardware, and that any of the devices or equipment discussed in relation to FIGS. 4-5 could be used to implement one or more portions of the process.

The above embodiments of the present disclosure are presented for purposes of illustration and not of limitation, and the present disclosure is limited only by the claims that follow. Furthermore, it should be noted that the features and limitations described in any one embodiment may be applied to any other embodiments herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for presenting, in an interactive program guide, a virtual content source for binge watching a program series, the method comprising:
   determine a number of episodes a user watches in one binge watching session based on a number of episodes of a program series the user has watched;
   determining a predicted number of episodes of the program series that the user will watch during a current binge watching session based on the number of episodes the user watches in one binge watching session;
   selecting the predicted number of episodes from the plurality of next episodes of the program series;
   creating the virtual content source including the selected episodes; and
   generating for display, in the interactive program guide, the virtual content source simultaneously with a plurality of media asset indicators corresponding to at least one other content source.

2. The method of claim 1, further comprising:
   retrieving, from a database, a data structure, wherein the data structure comprises a plurality of indicators;
   extracting, from the data structure, a first indicator of the plurality of indicators corresponding to a program series, wherein the first indicator indicates a total number of episodes of the program series the user has watched; and
   in response to determining that the total number of episodes of the program series the user has watched is more than one, extracting, from the data structure, a second indicator of the plurality of indicators corresponding to the program series, wherein the second indicator indicates a first number of binge watching sessions during which the user has watched at least one episode of the program series.

3. The method of claim 2, further comprising:
   extracting, from the data structure, a third indicator of the plurality of indicators corresponding to the program series, wherein the third indicator indicates a second number of binge watching sessions during which the user has watched at least two episodes of the program series;
   in response to determining that the second number of binge watching sessions during which the user has watched at least two episodes of the program series is more than one, determining, based on the first indicator of the plurality of indicators corresponding to the program series, the plurality of next episodes of the program series the user has not watched; and
   determining the predicted number of episodes of the program series that the user will watch during the current binge watching session based on a third number of episodes the user watches during the second number of binge watching sessions.

4. The method of claim 2, further comprising:
   extracting, from the data structure, a fourth indicator of the plurality of indicators corresponding to the program series, wherein the fourth indicator indicates a length of time the user spends watching the program series during the first number of binge watching sessions; and
   determining the predicted number of episodes of the program series that the user will watch during the current binge watching session based on the length of time.

5. The method of claim 1, wherein the number of episodes the user watches in one session is more than the plurality of next episodes of the program series the user has not watched, the method further comprising extracting, from the data structure, a fifth indicator of the plurality of indicators corresponding to the program series, wherein the fifth indicator indicates a related program series the user has not watched.

6. The method of claim 5, wherein the subset is a first subset, further comprising:
   determining a third number of episodes of the related program series that the user will watch based on the difference between the average number of episodes the user watches in one session and the plurality of next episodes of the program series the user has not watched; and
   selecting a second subset of a plurality of episodes of the related program series based on the third number of episodes of the related program series that the user will watch.

7. The method of claim 6, further comprising creating the virtual content source including the first subset of the plurality of next episodes of the program series and the second subset of the plurality of episodes of the related program series, wherein the first subset of the plurality of next episodes of the program series and the second subset of the plurality of episodes of the related program series are presented in sequence, wherein the subset of the plurality of next episodes of the program series is presented first.

8. The method of claim 1, wherein creating the virtual content source further comprises retrieving the subset of the plurality of next episodes of the program series from a plurality of content sources.

9. The method of claim 8, wherein the plurality of content sources comprises at least one of broadcast, on-demand, recorded, and streaming video content sources.

10. The method of claim 8, wherein determining the predicted number of episodes of the program series that the user will watch during the current binge watching session is further based on at least one of a time of day and a day of the week associated with a prior binge watching session.

11. A system for presenting, in an interactive program guide, a virtual content source for binge watching a program series, the system comprising:
    output circuitry; and
    control circuitry configured to:
       determine a number of episodes a user watches in one binge watching session based on a number of episodes of a program series the user has watched;
       determine a predicted number of episodes of the program series that the user will watch during a current binge watching session based on the number of episodes the user watches in one binge watching session;

select the predicted number of episodes from the plurality of next episodes of the program series;

create the virtual content source including the selected episodes; and generate for display, using the output circuitry, in the interactive program guide, the virtual content source simultaneously with a plurality of media asset indicators corresponding to at least one other content source.

12. The system of claim 11, wherein the control circuitry is further configured to:

retrieve, from a database, a data structure, wherein the data structure comprises a plurality of indicators;

extract, from the data structure, a first indicator of the plurality of indicators corresponding to a program series, wherein the first indicator indicates a total number of episodes of the program series the user has watched; and in response to determining that the total number of episodes of the program series the user has watched is more than one, extract, from the data structure, a second indicator of the plurality of indicators corresponding to the program series, wherein the second indicator indicates a first number of binge watching sessions during which the user has watched at least one episode of the program series.

13. The system of claim 12, wherein the control circuitry is further configured to:

extract, from the data structure, a third indicator of the plurality of indicators corresponding to the program series, wherein the third indicator indicates a second number of binge watching sessions during which the user has watched at least two episodes of the program series;

in response to determining that the second number of binge watching sessions during which the user has watched at least two episodes of the program series is more than one, determine, based on the first indicator of the plurality of indicators corresponding to the program series, the plurality of next episodes of the program series the user has not watched; and determine the predicted number of episodes of the program series that the user will watch during the current binge watching session based on a third number of episodes the user watches during the second number of binge watching sessions.

14. The system of claim 12, wherein the control circuitry is further configured to:

extract, from the data structure, a fourth indicator of the plurality of indicators corresponding to the program series, wherein the fourth indicator indicates a length of time the user spends watching the program series during the first number of binge watching sessions; and determine the predicted number of episodes of the program series that the user will watch during the current binge watching session based on the length of time.

15. The system of claim 11, wherein the number of episodes the user watches in one session is more than the plurality of next episodes of the program series the user has not watched, and wherein the control circuitry is further configured to extract, from the data structure, a fifth indicator of the plurality of indicators corresponding to the program series, wherein the fifth indicator indicates a related program series the user has not watched.

16. The system of claim 15, wherein the subset is a first subset, and wherein the control circuitry is further configured to:

determine a third number of episodes of the related program series that the user will watch based on the difference between the average number of episodes the user watches in one session and the plurality of next episodes of the program series the user has not watched; and select a second subset of a plurality of episodes of the related program series based on the third number of episodes of the related program series that the user will watch.

17. The system of claim 16, wherein the control circuitry is further configured to create the virtual content source including the first subset of the plurality of next episodes of the program series and the second subset of the plurality of episodes of the related program series, wherein the first subset of the plurality of next episodes of the program series and the second subset of the plurality of episodes of the related program series are presented in sequence, wherein the subset of the plurality of next episodes of the program series is presented first.

18. The system of claim 11, wherein the control circuitry configured to create the virtual content source is further configured to retrieve the subset of the plurality of next episodes of the program series from a plurality of content sources.

19. The system of claim 18, wherein the plurality of content sources comprises at least one of broadcast, on-demand, recorded, and streaming video content sources.

20. The system of claim 11, wherein the control circuitry configured to determine the predicted number of episodes of the program series that the user will watch during the current binge watching session is further configured to do so based on at least one of a time of day and a day of the week associated with a prior binge watching session.

* * * * *